July 2, 1929.  A. H. CORBETT ET AL  1,719,170
HARROW
Filed Aug. 21, 1928
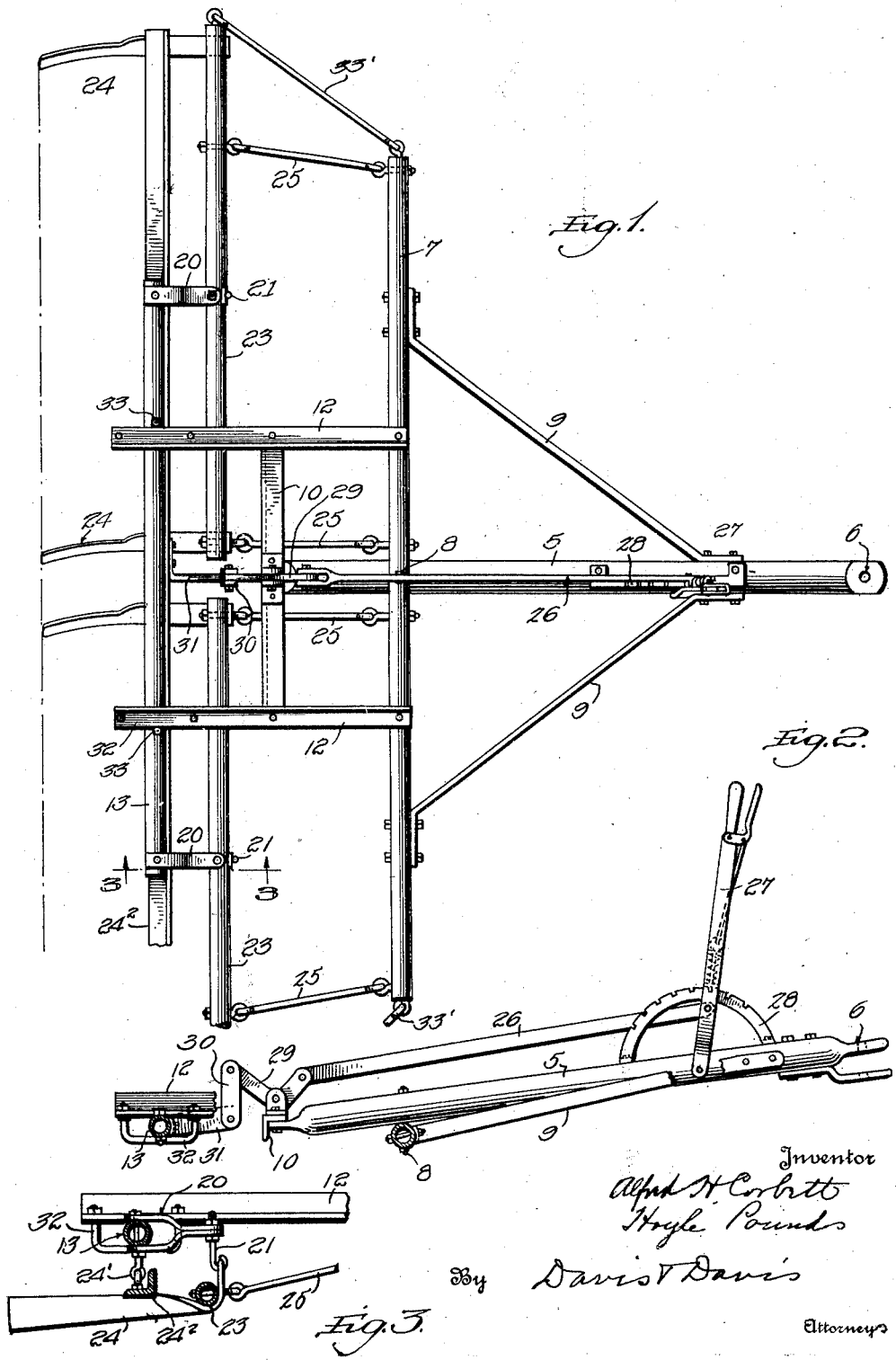

Patented July 2, 1929.

1,719,170

UNITED STATES PATENT OFFICE.

ALFRED H. CORBETT AND HOYLE POUNDS, OF WINTER GARDEN, FLORIDA.

HARROW.

Application filed August 21, 1928. Serial No. 301,052.

This invention has relation to that type of harrow covered by our former Patent 1,586,612, dated June 1, 1926. The main object of the invention is to simplify and improve the means for varying the depth of cut of the harrow-teeth, as more fully hereinafter set forth.

In the drawing—

Fig. 1 is a plan view of our improved harrow;

Fig. 2 is a vertical sectional view taken through the longitudinal center of the harrow;

Fig. 3 is a vertical section taken through the line 3—3 of Fig. 1.

Referring to the annexed drawing by reference-characters, 5 designates a draft-bar which is provided with an engaging-device 6 at its forward end to enable it to be attached in the usual manner to a tractor or other draft appliance. A cross-beam 7 is attached intermediate its ends at 8 to an intermediate portion of said draft-bar 5. Braces 9 extend between the forward portion of the draft-bar 5 and the ends of the cross-beam 7. A second cross-beam 10 is attached to the rear end of the draft-bar 5 and extends parallel to the cross-beam 7. Longitudinally-extending bars 12 have their forward ends connected to the beam 7 and their intermediate portions attached to the ends of the beam 10. These bars 12 extend in parallel relation to each other and rearwardly beyond the beam 10. A supporting-bar 13 is mounted to extend transversely of the rear portion of the harrow below the ends of the aforesaid bars 12, and this supporting bar 13 is attached to the rear ends of said bars 12 by loops 32 bolted to said bars 12 to thus pivotally and movably connect the bars 12 and the supporting bar 13. Extending forwardly from each end of the bar 13 is an arm 20, each of which arms is provided at its forward end with a depending hook 21 which pivotally engages in an upstanding ear carried by a gang-beam 23.

Each gang-beam carries a plurality of harrow-blades 24 of the usual construction. Each set of blades is connected to the rocking-bar 13 by means of link-connections 24', and each gang of teeth is connected together by a bar 24². Each of the gang-beams 23 is connected to the front cross-beam 7 by means of links 25.

Rigidly attached to the rocking-bar 13 is a central arm 31 whose forward end is pivotally connected by means of a link 30 to one end of the bell-crank 29 pivotally mounted at the rear end of the draft-bar 5. The other upstanding arm of the bell-crank is connected by a link rod 26 to a hand-lever 27 pivotally mounted on bar 5 at a point adjacent to the driver's seat of the tractor. A segment 28 on the bar 5 cooperates with the usual hand-operated locking-bolt carried by the lever 27. With this arrangement, it will be seen that the driver may, by means of the conveniently-located lever 27, rock the bar 13 for the purpose of adjusting the depth of the cut of the blades 24. The loops 32 are elongated fore and aft to give a certain amount of body play to the bar 13 so as to not only permit this bar to rock, but also to permit it to have a slight bodily movement forwardly and backwardly in order to insure the elimination of all binding in the adjustment mechanism. These loops 32 also serve to more securely attach the rock-bar 13 and the gang-beams to the frame. To prevent endwise movement of the bar 13 with reference to the frame, I provide the bar 13 with upstanding lugs 33 located at the outer edges of the bars 12.

What we claim as new is:

A harrow embodying a frame having a draft-bar and a pair of rearwardly-extending bars, a rocking-bar journalled under the said rearwardly-extending ends of said bars and having a central forwardly-projecting arm, a link connected to this forwardly-projecting arm, a bell-crank journalled on the frame at a point adjacent to the link and having one end attached to the aforesaid link, an operating rod connected to the other arm of said bell-crank, a manual means for adjusting this rod mounted on the forward end of the draft-bar, and teeth-carrying gang-beams connected to the aforesaid rocking-bar, the means for journalling said rocking-bar on said rearwardly-extending bars consisting of longitudinally-extending loops depending from said rearwardly-extending bars.

In testimony whereof we hereunto affix our signatures this 27th day of July, 1928.

ALFRED H. CORBETT.
HOYLE POUNDS.